US012474280B2

(12) United States Patent
Petrescu et al.

(10) Patent No.: US 12,474,280 B2
(45) Date of Patent: Nov. 18, 2025

(54) SELF-CENTERING CLAMP ADAPTER FOR X-RAY AND GAMMARAY WELD INSPECTION

(71) Applicant: Varex Imaging Corporation, Salt Lake City, UT (US)

(72) Inventors: Tibby Petrescu, Houston, TX (US); Cody W. Bussey, West Jordan, UT (US); Clyde May, Gulf Breeze, FL (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 0 days.

(21) Appl. No.: 18/500,957

(22) PCT Filed: Aug. 8, 2023

(86) PCT No.: PCT/US2023/071878
§ 371 (c)(1),
(2) Date: Nov. 2, 2023

(87) PCT Pub. No.: WO2024/151322
PCT Pub. Date: Jul. 18, 2024

(65) Prior Publication Data
US 2025/0164419 A1 May 22, 2025

Related U.S. Application Data

(60) Provisional application No. 63/396,171, filed on Aug. 8, 2022.

(51) Int. Cl.
*G01N 23/18* (2018.01)
*G01N 23/04* (2018.01)
(Continued)

(52) U.S. Cl.
CPC ............. *G01N 23/18* (2013.01); *G01N 23/04* (2013.01); *G01N 23/083* (2013.01);
(Continued)

(58) Field of Classification Search
CPC ...... G01N 23/18; G01N 23/04; G01N 23/083; G01N 33/2045; G01N 33/207;
(Continued)

(56) References Cited

U.S. PATENT DOCUMENTS 4,366,606 A  1/1983  Willis et al.
7,656,997 B1 *  2/2010  Anjelly ................. G01N 23/04
378/59

(Continued)

FOREIGN PATENT DOCUMENTS

CN  208383795 U  *  1/2019
CN  110763710  2/2020
(Continued)

OTHER PUBLICATIONS

Int'l Appl. No. PCT/US2024/032693, International Search Report dated Sep. 26, 2024.
(Continued)

*Primary Examiner* — Kiho Kim
(74) *Attorney, Agent, or Firm* — Dorsey & Whitney LLP

(57) ABSTRACT

Some embodiments include a radiographic inspection system, comprising: a clamp comprises a housing, a base, three clamping contacts, and an actuator; wherein: the clamp is configured to be positioned around a structure and to be coupled to the structure; the base is coupled to the housing through a rotary bearing, is moveable relative to the housing, and is configured to support a detector such that the detector may rotate around the structure while the clamp remains stationary relative to the structure; and the three clamping contacts are moveable relative to the housing via the actua-
(Continued)

tor in a manner such that the three clamping contacts self-center on the structure.

20 Claims, 13 Drawing Sheets

(51) Int. Cl.
    *G01N 23/083*     (2018.01)
    *G01N 33/2045*     (2019.01)
    *G01N 33/207*     (2019.01)

(52) U.S. Cl.
    CPC ....... *G01N 33/2045* (2019.01); *G01N 33/207* (2019.01); *G01N 2223/202* (2013.01); *G01N 2223/316* (2013.01); *G01N 2223/628* (2013.01); *G01N 2223/629* (2013.01)

(58) Field of Classification Search
    CPC ....... G01N 2223/202; G01N 2223/316; G01N 2223/628; G01N 2223/629; G01N 23/20025
    See application file for complete search history.

(56) References Cited

U.S. PATENT DOCUMENTS

| 9,244,024 | B1* | 1/2016 | Patterson | G01N 23/16 |
| 2005/0041775 | A1* | 2/2005 | Batzinger | G01N 23/083 |
| | | | | 378/59 |
| 2009/0121146 | A1 | 5/2009 | Luhta et al. | |
| 2015/0330860 | A1* | 11/2015 | Koyanagi | G01N 29/04 |
| | | | | 901/19 |
| 2018/0001422 | A1* | 1/2018 | Rajagopalan | B23K 26/282 |
| 2019/0196030 | A1 | 6/2019 | Yang | |
| 2020/0145601 | A1 | 5/2020 | Tsunai et al. | |
| 2022/0099598 | A1 | 3/2022 | Nisius et al. | |
| 2022/0244198 | A1 | 8/2022 | Bowdon et al. | |
| 2023/0236140 | A1* | 7/2023 | Rothschild | G01N 23/10 |
| | | | | 378/57 |

FOREIGN PATENT DOCUMENTS

| EP | 0823132 | 10/1996 |
| EP | 0897597 | 11/1997 |

OTHER PUBLICATIONS

Int'l Appl. No. PCT/US2024/032693, Written Opinion dated Sep. 26, 2024.

Int'l Appl. No. PCT/US2023/071878, International Search Report dated Sep. 12, 2024.

Int'l Appl. No. PCT/US2023/071878, Written Opinion dated Sep. 12, 2024.

* cited by examiner

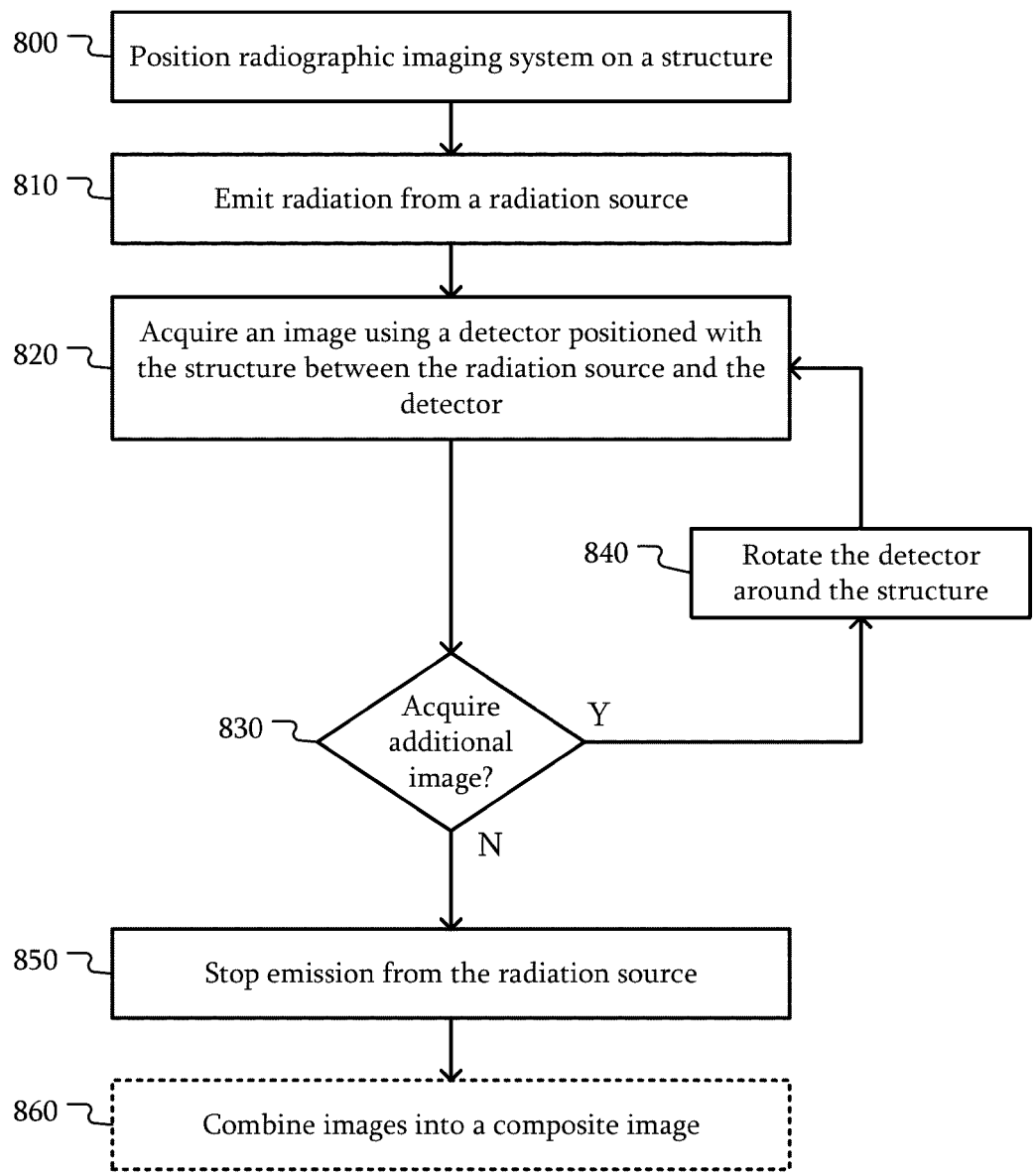

SELF-CENTERING CLAMP ADAPTER FOR X-RAY AND GAMMARAY WELD INSPECTION

Radiographic inspection systems may generate images of objects such as pipes and pipe welds. For example, a radiographic inspection system may be attached to a pipe to generate multiple images of a weld. A radioisotope may be exposed from a shielded exposure device and/or collimator, an image may be captured, the radioisotope may be retracted into the shielded exposure device and/or collimator, and a technician may move the radiographic inspection system to another position. The process may repeat until a desired number of images are generated.

BRIEF DESCRIPTION OF SEVERAL VIEWS OF THE DRAWINGS

FIG. 7 is a flowchart of an operation of a radiographic inspection system according to some embodiments.

DETAILED DESCRIPTION

Figure 1A:
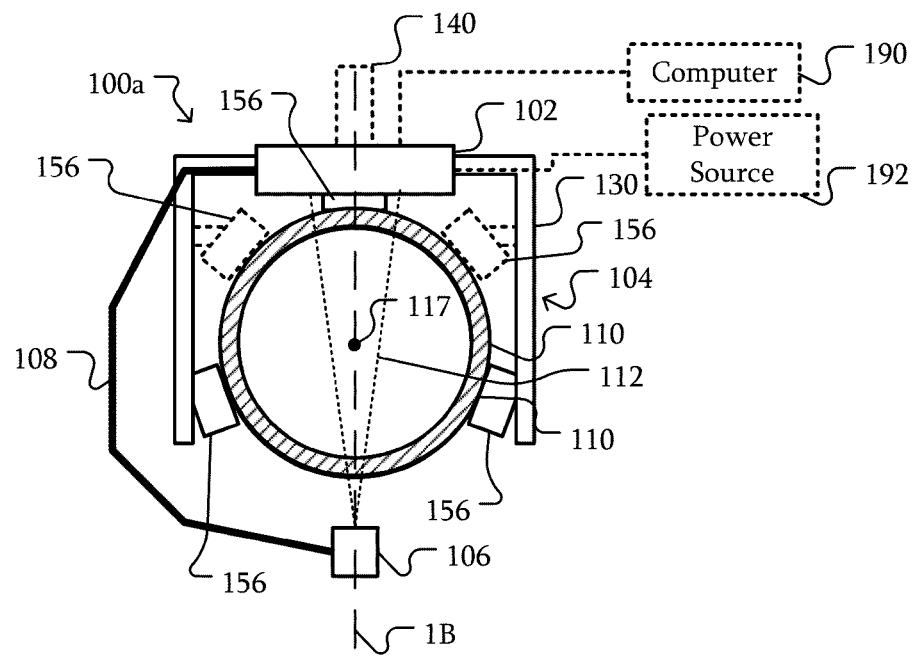
FIGS. 1A-1B are block diagrams of a radiographic inspection system using radioisotopes according to some embodiments.

Some embodiments relate to radiographic inspection systems and, in particular, to radiographic inspection systems for pipes and other structures using a radiation or radiographic source, such as radioisotopes.

Pipe welds for a variety of different pipe diameters may be inspected using radiographic testing (RT). Examples of such pipe include about 1.5 inch (in.) to about 12 inch (about 3.81 to 30.5 centimeters (cm)) diameter pipe. The pipe may be initially welded during the construction of a facility such as a refinery or chemical plant. The welds may be inspected after the initial welding and/or at periodic inspection intervals, such as when the pipes are inspected for corrosion as may be required by a regulatory or quality assurance requirements. Conventionally, some RT methods use a radioisotope such as Ir-192 as a radiographic source and film to perform a double wall single image (DWSI) process where the radioisotope source is on one side of the pipe and the film is on the other. Double wall refers to the radiation from the radiographic source penetrating two walls of the pipe (e.g., the pipe wall closest to the radiographic source and the pipe wall closest to the film) before an image is acquired. The portion of the weld being inspected is the side closest to the film. The time for this type of imaging includes the technician placing the source collimator and film around the pipe, retreating to a safe distance to minimize radiation exposure before exposing the source, exposing the pipe for the correct time based on the pipe diameter and wall thickness, retracting the source, retrieving the exposed film for developing, and then moving the source and detector to achieve additional DWSI images of the weld for total coverage. The process may take 3 to 6 film shots to get full coverage and about 15 to 20 minutes of time. As a result, images for about 3-4 complete welds per hour can be completed. In addition, each film must then be reviewed on site and stored in a film repository or converted to digital format for digital storage. Some processes use a flexible phosphor imaging plate that is exposed. The exposed plate is scanned and digitized.

These techniques may be labor intensive and can limit throughput that is especially crucial during facility construction. Other systems designed for weld inspection may include x-ray tubes for DWSI as well as single wall single image (SWSI). SWSI is a technique whereby the radiographic source is placed inside the pipe by some suitable mechanism and the film wrapped around the outside of the pipe (or a portion of the pipe) and the radiation from the radiographic source on penetrate one wall of the pipe to acquire the image. SWSI with film wrapped around the entire outside of the pipe may be known as a panoramic exposure or imaging. However, a system that includes an x-ray tube will be a larger system to accommodate both the power and the weight, which may limit the applicability to large diameter pipes. The radioisotope source can be much lighter than an x-ray tube generating similar x-ray or gamma ray energy. In addition, moving such a system to another weld location may require lifting equipment, such as a crane, with larger setup times.

Figure 1B:
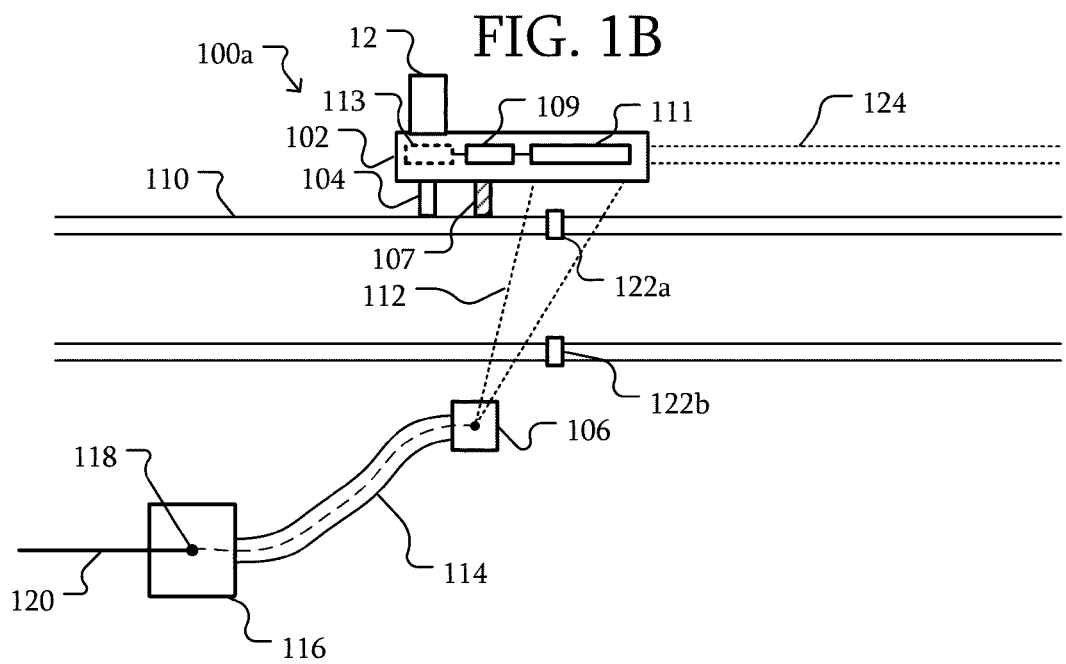

FIG. 1A-1B are block diagrams of radiographic inspection systems using radioisotopes as the radiographic source according to some embodiments. FIG. 1A is a cutaway view and FIG. 1B is a cross-sectional view along plane 1B. Referring to FIGS. 1A and 1B, in some embodiments, the radiographic inspection system 100a includes a detector 102, a clamp 104, a radioisotope collimator 106, and a collimator support arm (CSA) 108. A radioisotope 118, exposure device 116, exposure tube 114, or the like may be part of and/or used with the system 100 to generate images based on the pipe 110 or other objects. In some embodiments, the clamp 104 may include a housing 130, an actuator 140, and structure contacts (clamping contacts or jaws) 156, which will be described in further detail below.

The detector 102 includes a two-dimensional imaging array 111 of sensors configured to sense the radiation 112 from a radioisotope 118 when disposed in the radioisotope collimator 106. The detector 102 may include an amorphous silicon (a-Si), indium gallium zinc oxide (IGZO), or complementary metal-oxide-semiconductor (CMOS) flat panel detector, or the like. In other embodiments, the detector 102 may include a curved detector. In other embodiments, the detector 102 may include a flexible detector 102 that may be conformable to the curvature of the pipe 110. In some embodiments, the curvature of the flexible detector 102 may be different than that of the pipe 110 to accommodate the detector 102 being radially offset from the pipe 110. In other embodiments, the detector 102 may include a line scanner with a small number of pixels along the width relative to number of pixel along the length. Line scanners work well in continuous scanning applications or applications of continuous uniform movement of the detector 102. In some embodiments, a motorized version of the rotation or motion of the detector (and the radiographic source) around the pipes or other structure may allow dynamic imaging such as computerized tomographic (CT) images as well as time-delay integration (TDI) imaging when employing line scan photon counting x-ray detectors such as direct conversion detectors. These embodiments may time saving and higher throughput pipe weld scanning.

A conversion screen, scintillator, or the like may be included in the detector 102 to convert the radiation 112 into wavelengths detectable by the imaging array 111 of the detector 102. For example, a scintillator may include gadolinium oxysulfide ($Gd_2O_2S$; GOS; Gadox), gadolinium oxysulfide doped with terbium ($Gd_2O_2S$:Tb), cesium iodide (CsI), or the like. Although some materials of the scintillator have been used as examples, in other embodiments, the material may be different depending on the particular radioisotope 118. In other embodiments, the imaging array 111 may include direct conversion sensors, including cadmium telluride (CdTe), cadmium zinc telluride (CdZnTe or CZT), selenium, or the like, configured to directly convert the radiation 112 into a signal.

In some embodiments, a pixel area of the imaging array 111 of the detector 102 may be about 14.6×14.6 cm (or 5.8×5.8 in). The imaging array 111 may include a 1152×1152 array of pixels. The pixel pitch may be about 127 microns (μm). The detector 102 may be configured to digitize outputs of the pixels with at least 16-bit precision. The detector 102 may include communication interfaces such as wired or wireless interfaces, like a universal serial bus (USB) interface, Ethernet interface, or the like. Although particular components and parameters of the detector 102, imaging array 111, or the like have been used as examples, in other embodiments, the components and/or parameters may be different.

The detector 102 may include control logic 109. The control logic 109 may include a general purpose processor, a digital signal processor (DSP), an application specific integrated circuit (ASIC), a microcontroller, a programmable logic device (e.g., field-programmable gate array [FPGA]), discrete circuits, a combination of such devices, or the like. The control logic 109 may include external interfaces, such as address and data bus interfaces, interrupt interfaces, or the like. The control logic 109 may include other interface devices, such as logic chipsets, hubs, memory controllers, communication interfaces, or the like to connect the control logic 109 to internal and external components. The control logic 109 may be configured to control the variety of operations described herein.

The system 100a may be configured to operate with pipe 110 having a diameter from about 1 in. to about 12 in. (about 2.5 cm to 30.5 cm). In some embodiments, the range of pipe 110 diameter may be different. The system 100a may be adjustable so that the system 100 may be used with pipes 110 of a range of diameters. The pipe 110 may be ferrous or non-ferrous. In some embodiments, the use of an x-ray source may have difficulty due to refraction from alloy elements in some pipe. The use of a radioisotope 118 may reduce an effect of such alloys.

In some embodiments, the system 100 may weigh less than about 30 pounds (lbs.; about 13.6 kilograms (kg)), about 55 pounds (about 25 kg), or the like. The weight may be low enough that a single person may attach, operate, and detach the system 100 from the pipe 110. For example, the detector 102 may weigh about 6 lbs. or 2.7 kg. Motors, structural components, or the like may be selected to keep the weight under the limits described above.

The radioisotope collimator 106 is a structure configured to shape the radiation 112 from the radioisotope 118. For example, the radiographic collimator 106 may include shielding to block radiation 112 emitted in undesirable directions and a collimating structure such as a series of parallel openings to shape the emitted radiation 112 when the radioisotope 118 is within the radioisotope collimator 106.

The radioisotope collimator 106 may be rigidly and/or adjustably coupled to the detector 102 by the collimator support arm 108. The collimator support arm 108 may provide zero or more degrees of freedom to position the radioisotope collimator 106 relative to the detector 102. For example, the collimator support arm 108 may include a c-shaped arm that rigidly connects the radioisotope collimator 106 to the detector 102. Such a system 100 may be designed for a single diameter of pipe. In other examples, the collimator support arm 108 may include multiple degrees of freedom to rotate and/or translate the radioisotope collimator 106 relative to the detector 102. The collimator support arm 108 may be configurable to be fixed to rigidly (or semi-permanently) connect the radioisotope collimator 106 to the detector 102 after adjustment. Thus, the orientation of the radioisotope collimator 106 and the detector 102 may be fixed during that operation. However, for another operation, such as when the system 100 is moved to a different diameter pipe, the collimator support arm 108 may be adjusted to accommodate the difference in the pipe diameter. In some embodiments, the collimator support arm 108 may include a series of joints to adjust the position and orientation of the radioisotope collimator 106. Regardless, the collimator support arm 108 may be configurable to be fixed after adjustment such that when the detector 102 moves around the pipe 110, the relative position between the detector 102 and the radioisotope collimator 106 remains substantially the same. Substantially the same may include the same position but also includes some variation due to mechanical tolerances, distortion of the collimator support arm 108, or the like.

Radioisotopes 118 may be more extensively used in field radiography than x-ray tubes in particular industries such as the oil and gas industry for reasons such as size, weight, power, cabling, accessibility, and/or energy requirements. With a system 100a described herein, the user may continue to use a radioisotope 118 with the improved performance of the system 100a.

The radioisotope 118 may be configured to be disposed in the exposure device 116. The exposure device 116 may include a structure that allows for the radioisotope to be extended and retracted towards the radioisotope collimator 106. For example, the radioisotope 118 may be coupled to a cable 120. The cable 120 may be manipulated, such as by turning a crank, activating a motor, or the like, to move the radioisotope 118 through the exposure tube 114 to the radioisotope collimator 106. The radioisotope 118 is illustrated in the retracted position in solid lines and in the exposed position in dashed lines.

When exposed, the radiation 112 travels through both walls of the pipe 110, but only the portion 122a of the weld 122 on the wall closest to the detector 102 sufficiently sharp for inspection. That is, the portion 122b of the weld 122 may be in a position that does not result in a noticeable detected signal at the imaging array 111 and/or may be in a position where an intensity of the radiation 112 is reduced relative to the portion 122a due to the radioisotope collimator 106. The radioisotope collimator 106 may be axially offset along the pipe 110 from the detector 102. In an example, the axial offset may avoid the imaged radiation 112 penetrating at least the portion 122b of the weld 122 on the wall furthest from the detector 102 (the wall closest to the radioisotope collimator 106). The collimator support arm 108 may be configurable to place the radioisotope 118 in such a position for a variety of diameters of pipe. With the radioisotope 118 in place, the system 100 or a part of the system 100 including the detector 102 and the collimator support arm 108 may rotate 360 degrees around the pipe 110 to inspect 100% of the weld.

In some weld imaging applications, a detector and an x-ray source may not be practical on pipes with diameters less than about 15 in. An x-ray source with sufficient energy may be too large to be placed around a relatively smaller pipe. An x-ray source that is small enough may not generate radiation with a sufficient energy to penetrate the pipe. That is, the radiation needs a sufficient energy to penetrate the pipe, depending on its size or the pipe schedule. An example of such an energy is 250 kiloelectronvolts (keV) or more. A radioisotope may provide radiation with this energy and still be relatively portable.

Some embodiments include a human portable inspection system that can be attached and removed easily. In particular, the human portable inspection system may be attached and removed by a single person. A human portable inspection system may include a system that weighs less than about 20 pounds (about 9.1 kg), less than about 25 pounds (about 11.4 kg), less than about 30 pounds (about 13.6 kg), less than about 45 pounds (about 20.4 kg), or less than about 55 pounds (about 25 kg). The system 100 is an example of such a human portable inspection system.

In some embodiments, the detector 102 is configured to receive power and/or communication through one or more wired or optical cables 124. For example, the detector 102 and other components of the system 100a may receive power from a power source 192, communicate with a computer 190, or the like through the cables 124. In operation, as the system 100a rotates about the pipe 110, the cables 124 may be wound around the pipe 110. Thus, the cables 124 may be flexible enough and long enough to wind around the pipe 110 by at least one complete revolution. In particular, as no human intervention may be permitted during the operation as the radioisotope 118 may be continuously exposed, which generates high doses of radiation.

In some embodiments, the detector 102 may be configured to communicate wirelessly without using the cables 124. For example, the detector 102 may include wireless communication systems 113 for operation with Wi-Fi, Bluetooth, cellular data networks, satellite communication networks, or the like. In some embodiments, the control logic 109 may be configured to communicate the images through the wireless communication system 113. In other embodiments, the detector 102 may be configured to communicate through the cable 124 to a wireless communication system. Accordingly, data generated by the system 100 may be transmitted as desired to a variety of destinations and/or the control of the system 100 may be performed remotely.

As will be described herein, once the system 100a is secured to the pipe 110, the radioisotope 118 is exposed. While the radioisotope 118 is exposed, the system 100 is rotated 360 degrees around the pipe 110 and the resulting digital images can be stitched together to present one image of the weld for evaluation. This composite image can be inspected on site or can be transmitted via network or satellite communication for evaluation by an offsite expert. The image along with any other metadata collected can then also be digitally stored.

In some embodiments, the position of the radiographic collimator 106 may be fixed relative to the detector 102 and thus, its position may not be adjusted; however, in other embodiments, the position may be adjustable as disclosed in U.S. Patent Application Publication No. 2021/0190705, the entire disclosure of which is hereby incorporated by reference. For example, the collimator support arm 108 may include multiple degrees of freedom (as illustrated in FIGS. 4A-5D) that may be adjusted to align the radiographic collimator 106 such that the expected radiation 112 (as illustrated in FIG. 1A) may be incident on the imaging array 111 (as illustrated in FIG. 1A). The collimator support arm 108 may provide zero or more degrees of freedom to position the radiation source 106 relative to the detector 102. For example, the collimator support arm 108 may include a c-shaped arm that rigidly connects the radiographic collimator 106 to the detector 102. Such a system 100a may be designed for a single diameter of pipe 110. In other examples, the collimator support arm 108 may include multiple degrees of freedom to rotate and/or translate the radiographic collimator 106 relative to the detector 102. The collimator support arm 108 may be configurable to be fixed to rigidly (or semi-permanently) connect the radiation source 106 to the detector 102 after adjustment. For example, the collimator support arm 108 may be indexed for rapid semi-fixed adjustment for different pipe 110 diameters and pipe 110 configurations. Thus, the orientation of the radiographic collimator e 106 and the detector 102 may be fixed during that operation. However, for another operation, such as when the system 100a is moved to a different diameter pipe, the collimator support arm 108 may be adjusted to accommodate the difference in the pipe 110 diameter. In some embodiments, the collimator support arm 108 may include a series of joints (illustrated with respect to FIG. 4A-4D) to adjust the position and orientation of the radiographic collimator 106. Regardless, the collimator support arm 108 may be configurable to be fixed after adjustment such that when the detector 102 moves around the pipe 110, the relative position between the detector 102 and the radiographic collimator 106 remains substantially the same. Substantially the same may include the same position but also includes some variation due to mechanical tolerances, distortion of the collimator support arm 108, or the like.

In some embodiments, the collimator support arm 108 may include joints or actuators that are controllable by the control logic 109. For example, the collimator support arm 108 may include rotatable and/or translatable joints controlled by actuators and the control logic 109 such that the radiographic collimator 106 may be placed in a variety of locations relative to the detector 102 and/or insulated pipe 110.

The radioisotope may be extended to the radiographic collimator 106. As a result, radiation 112 may pass through the pipe 110, a weld 122 (as illustrated in FIG. 1B), and may be detected by the imaging array 111 of the detector 102. An image of the weld 122 may be generated at this rotational position around the pipe 110.

In some embodiments, the clamp 104 may be a structure attachable to the pipe 110 and the detector 102 may rotate about the clamp 104 and consequently rotate about the pipe 110. In some embodiments, the detector 102 and/or the clamp 104 may be configurable to place the detector 102 at a desired distance from the weld and/or the pipe 110 surface. For example, the clamp 104 may be configurable to place the detector 102 with a clearance of 0.35 in. (or 8.9 millimeters (mm)), clearance of 0.5 in. (or 1.27 cm), clearance of 1 in. (or 2.54 cm), relative to the weld 122 or pipe 110 wall. In some embodiments, the clamp 104 may be configured for encircling pipes 110 with a range of diameters, such as from about 1.5 in. to about 12 in. (or about 3.81 cm to about 30.5 cm), and more specifically, smaller bore pipes such as those with an outer diameter of about 1.5 in. to about 3 in (or about 3.81 cm to about 7.62 cm).

The use of a detector 102 alone or with other structures with a small bore piping structure that is about 3 in. or less may be difficult due to difficulty positioning the detector 102 to capture an image or images. The use of a clamp 104 as described herein allows for the detector to be quickly and accurately positioned on a small-bore piping structure, including a small-bore piping structure less than equal to 3 in. (about 7.62 cm). As a result, the advantages of a digital detector 102 may be realized with a small-bore piping structure.

The system 100 may be rotated about the pipe 110 in 90° increments as shown in FIGS. 4A-4D; however, in other embodiments, the angular change may be different, including smaller or larger changes. In particular, while the radioisotope 118 is generating the radiation 112 in the radioisotope collimator 106, the detector 102 may be moved from position to position. At each position, an image is acquired. For example, a total of 10 images may be acquired, each equally spaced around the pipe 110. Once a first image is acquired, the detector 102 may be rotated 36°. Another image may be acquired at the new position. The rotation and acquisition may be repeated until images at each desired location are acquired. In some embodiments, an image may be acquired at the end in the position where the imaging started. Once the last image is acquired, the radioisotope 118 may be retracted into the exposure device 116.

In some embodiments, the radioisotope 118 may be exposed and retracted only once during a scan of the entire weld 122. However, in other embodiments, the radioisotope 118 may be exposed and retracted more than once per weld 122, but less than once per image. For example, the radioisotope 118 may be exposed, one half of the images are acquired, and the radioisotope 118 is retracted. The process may be repeated to generate images at all desired positions along the weld 122. As the process may be performed for less than once per acquired image, the overhead of exposing and retracting the radioisotope 118 may be reduced.

In some embodiments, the system 100a is set-up with lead markers. Lead markers may be placed close to the weld in a circumferential manner such that the markers appear in the acquired images. The system 100 may be attached to the pipe 110 in a location overlapping the weld 122. The collimator support arm 108 may then be adjusted to position the radioisotope collimator 106 to generate an acceptable image.

Although a radiographic collimator 106 with a radioisotope 118 has been used as an example, in some embodiments the radiographic collimator 106 may include any radiation source such as an x-ray source, a radioisotope, or the like.

Figure 1C:
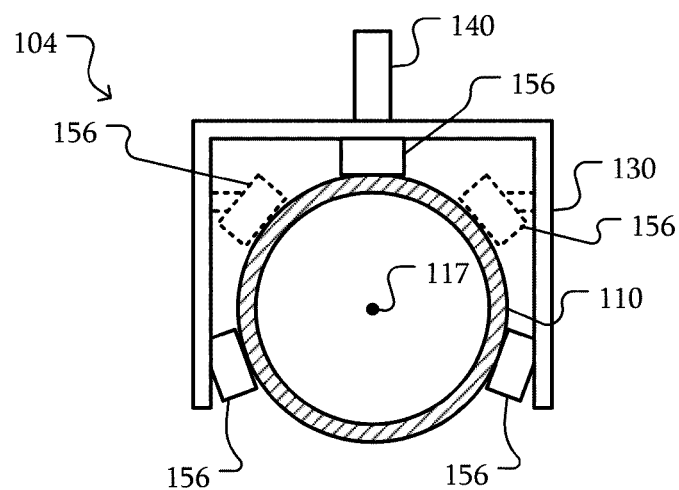
FIG. 1C is a block diagram of a clamp according to some embodiments.

FIG. 1C is a block diagram of a clamp according to some embodiments. The clamp 104 may include a housing 130, an actuator 140, and at least three contacts 156. Three contacts 156 are illustrated as an example; however in other embodiments more contacts 156 may be present as illustrated by the contacts 156 with dashed lines. The number of additional contacts 156 may be 1, 2, or any number greater, the number of which may be dependent on desired range of diameters of pipe 110. The contacts 156 are coupled to the housing 130 and the actuator 140 such that when the actuator 140 is actuated, the contacts 156 move in a manner such that the contacts 156 remain substantially centered about a center 117 (e.g., substantially self-centered). That is, as the contacts 156 are moved by the actuator 140, contact points on the contacts 156 are disposed on a circle with a radius that changes based on the actuator 140. However, the center 117 of those various diameter circles of the pipes or other structures are substantially the same relative to the housing. Substantially the same includes variation due to mechanical tolerances. In some embodiments, a single actuator 140 may be used to place the clamp 104 and any associated devices such as a detector 102 as described herein with a single movement on a variety of pipes 110 with different diameters. This single actuator 140 may reduce a time the system is moved from location to location and increase throughput.

Although a detector 102 is an a example of a device that may be attached to the clamp 104, in other embodiments, other devices may be attached to the clamp 104 instead of or in addition to the detector 102. For example, a welder may be attached to the clamp 104. As a result, the welder may be self-centered on a pipe 110, self-centered on a pipe 110 with a different diameters, or the like as described herein. For example, in some examples (not shown), radiographic inspection may occur shortly after welding with a single clamp attachment to the pipe or other structure.

Figure 2:
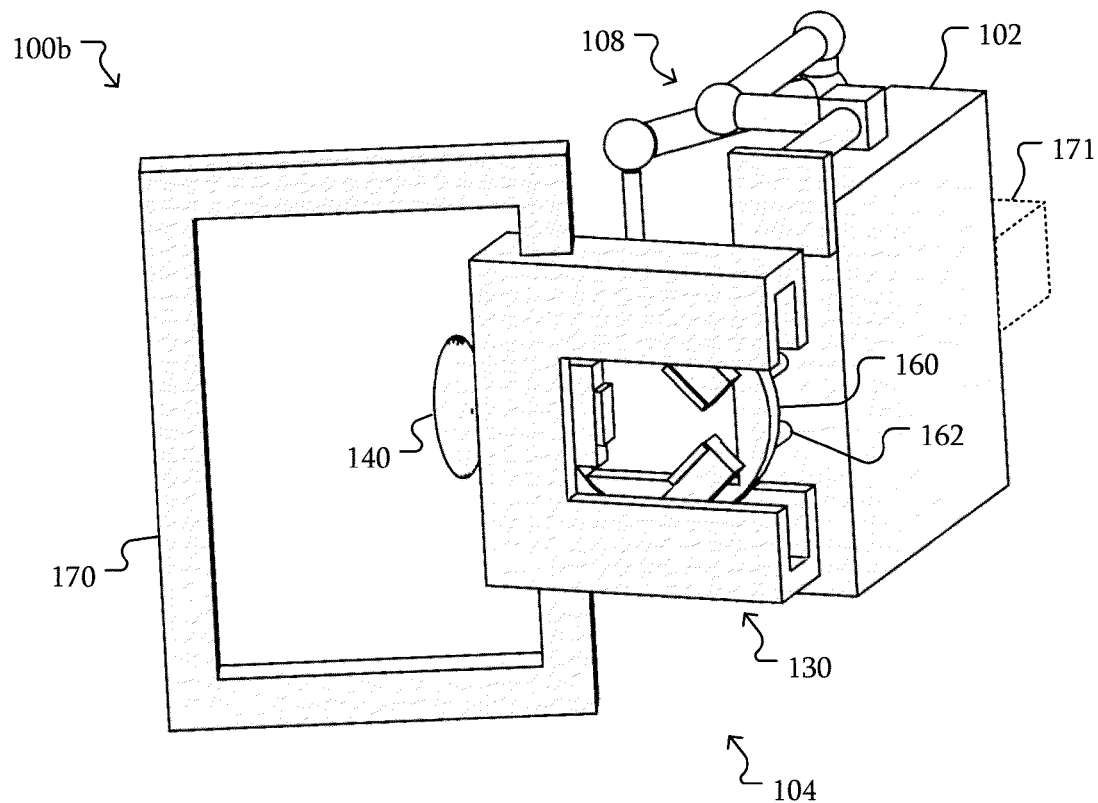
FIG. 2 is a perspective view of a radiographic inspection system using radioisotopes according to some embodiments.

FIG. 2 is a perspective view of a radiographic inspection system using radioisotopes according to some embodiments. The radiographic inspection system 100b may be similar to the radiographic inspection systems 100a described with respect to FIGS. 1A-1C. The radiographic inspection system 100b includes a detector 102, a clamp 104, and a collimator support arm 108. The detector 102 and collimator support arm 108 may be similar to the detector 102 and collimator support arm 108 described above. The detector 102 may be attached to a base 160 that is attached to the housing 130. As will be described in further detail below, the base 160 may be movable (such as being rotatable) relative to the housing 130. As a result, the detector 102 may be movable relative to the housing 130 and hence, any structure on which the housing is mounted. As will be described in further detail below, the base 160 may be attached to the detector 102 thought a connector 162 or other structure. In some embodiments, the clamp 104 may include a handle 170 coupled to the housing 130. The handle 170 may be configured to allow a user to transport the radiographic inspection system 100b, position the radiographic inspection system 100b on a structure such as a pipe 110, or the like. The handle 170 may allow a user to position the radiographic inspection system 100b using a single hand while manipulating the actuator 140. In some embodiments, the detector 102 may include a handle 171. As will be described in further detail below, the handle 171 may be usable to manually move the detector 102 relative to the housing 130.

Figure 3A:
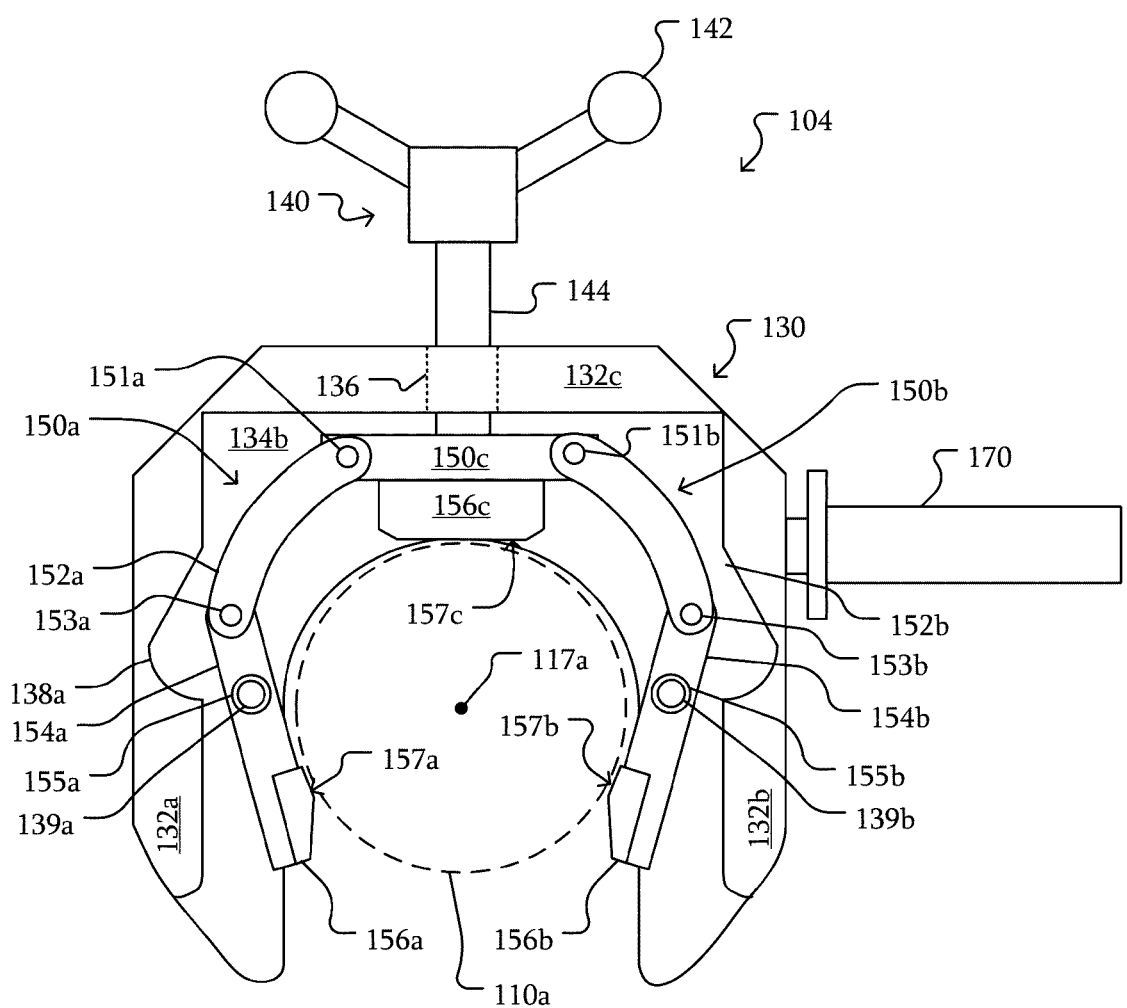
FIGS. 3A-3B are cutaway views of a clamp that is part of a radiographic inspection system according to some embodiments.
Figure 3B:
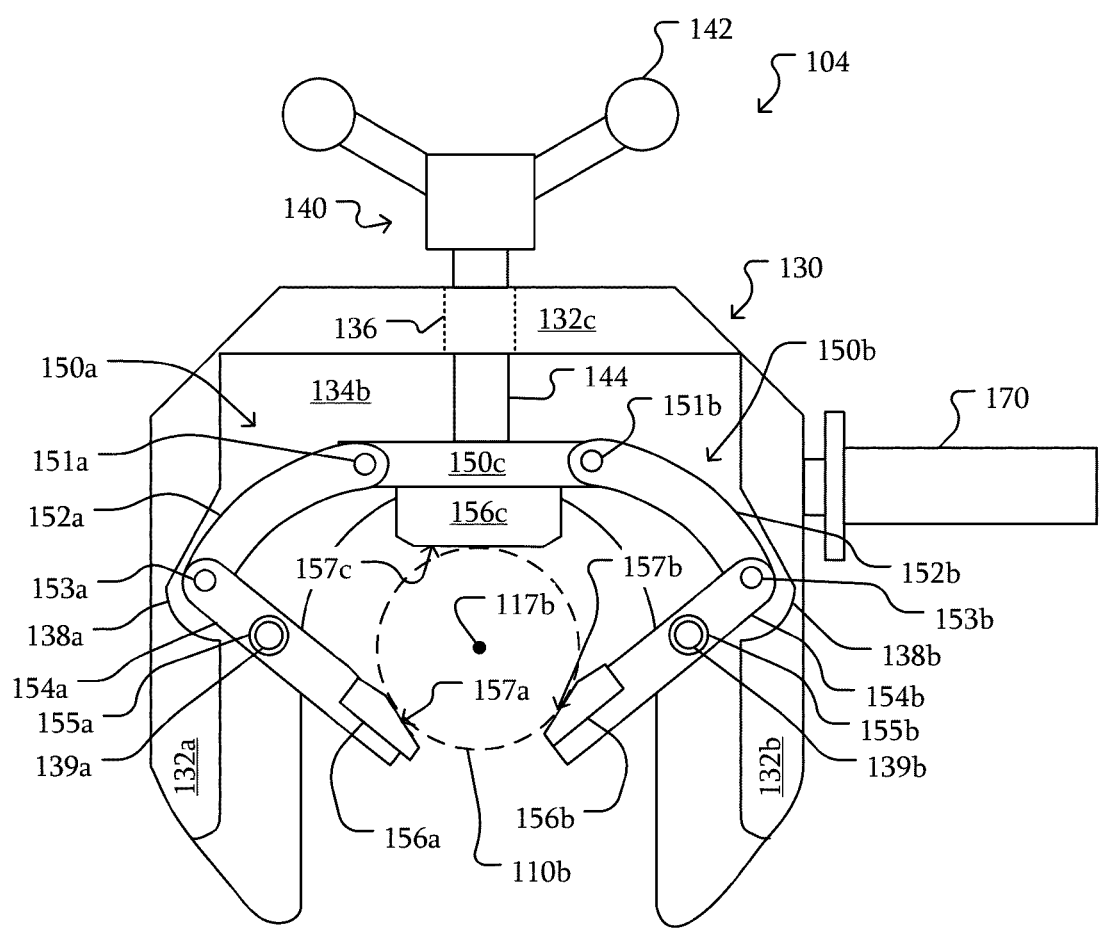

FIGS. 3A-3B are cutaway views of a clamp that is part of a radiographic inspection system according to some embodiments. Referring to FIGS. 2-3B, in some embodiments, the clamp 104 comprises a housing 130. In some embodiments, the housing 130 may comprise a plurality of sections that are integral. In some embodiments, the housing 130 may comprise a plurality of separate sections. For example, the sections may include a first side section 132a, a second side section 132b, and a top or center or central section 132c. The sections 132a-c extend between two opposing faces 134a-b. The top section 132c may have an aperture 136. The side sections 132a-b may include slots 138a-b.

In some embodiments, the clamp 104 may comprise an actuator 140. The actuator 140 may comprise a handle 142 and a screw 144 extending from the handle 142 and through the aperture 136 in top section 132c. The threads of the screw 144 engage the threads of the aperture 136 in top section 132c. Although a screw actuator 140 has been used as an example, in other embodiments, a different movement mechanism may be used, such as a solenoid, piston, hydraulic or pneumatic cylinders, springs, or the like. In some embodiments, a single turn or a few turns of the screw 144 may be sufficient to release the clamp 104 from the pipe 110 (illustrated with a dashed line).

In some embodiments, the clamp 104 may comprise a plurality of arms 150. The arms 150 may be configured to move upon movement of the actuator 140. The arms 150 may be configured such that movement of the arms 150 enables the clamp to self-center on the pipe 110. Self-centering includes positioning contact locations on the arms 150 that are substantially equidistant from a center 117 over a range of motion of the arms 150. "Substantially equidistant" means that the distance are equidistant within mechanical tolerances of the clamp 104 and the pipe 110.

In this example, the clamp 104 includes three arms 150 including a first articulated arm 150a, a second articulated arm 150b, and a central arm 150c. The actuator 140 may be, in some embodiments, connected to the arms by the screw 144, which is connected to the central arm 150c.

The first articulated arm 150a may be connected to the central arm 150c via a first upper hinge 151a and the second articulated arm 150b may be connected to the central arm 150c via a second upper hinge 151b. The first articulated arm 150a may comprise a first upper arm segment 152a, a first lower hinge 153a, and a first lower arm segment 154a. The second articulated arm 150b may comprise a second upper arm segment 152b and a second lower arm segment 154b that is connected to the second upper arm segment 152b via a second lower hinge 153b.

The lower arm segment 154a and the second lower arm segment 154b respectively define or include apertures 155a and 155b. Apertures 155a and 155b respectively receive a first knuckle pin 139a and a second knuckle pin 139b that extend from one or both of the first face 134a and second face 134b of the housing 130. The lower arm segment 154a and the second lower arm segment 154b each respectively pivot about the first knuckle pin 139a and the second knuckle pin 139b. The proximal ends of the lower arm segment 154a and the second lower arm segment 154b may each extend or swing respectively into the 138a-b slots of the housing 130 of the side sections 132a-b along with the distal ends of the upper arm segments 152a-b and the lower hinges 153a-b.

Each arm 150 may feature a clamping contact 156 configured for engagement with a structure. For example, a clamping contact 156a and a clamping contact 156b may be respectively positioned at the distal ends of the first lower arm segment 154a and the second lower arm segment 154b. The central arm 150c may have a clamping contact 156c. The clamping contacts have engagement surfaces 157a-c that contact the pipe 110. These engagement surfaces are the surfaces of the arms that contact the pipe 110 or other structure as the clamp self-centers on the pipe 110. The engagement surfaces 157a-c may be continuous surfaces, have discontinuities, or the like. In some embodiments, the clamping contact 156 may be integral with the associated arm segment 154a-b or central arm 150.

The engagement surfaces of the clamping contacts 156 may vary. For example, the engagement surface 157c of the clamping contact 156c on the central arm 150c may be relatively flat while the engagement surfaces of the clamping contacts 156a-b may transition from being relatively flat at the proximal end of the clamping contact 156 to being increasingly inclined downward toward the distal end. The transition from the proximal to the distal end may also be described as a taper or a decrease in thickness of the clamping contact 156. The increasing taper may enable the arms to adjust to pipes 110 or other structures having different diameters as the clamping contacts 156 self-center on the structure.

The clamp 104 may comprise a base 160 that is moveable relative to the housing 130 and is configured to support the detector 102 such that the detector 102 may rotate around the pipe 110 or other structure while the clamp 104 remains stationary relative to the structure. For example, the base 160 may be attached to the housing 130 through a thrust bearing or other rotary bearings. The rotary bearing may allow the base 160 to rotate relative to the housing 130 and hence, allow the detector 102 to rotate relative to the housing 130. In some embodiments, the base 160 may be motorized for movement of the detector 102 (such as by a stepper motor or the like) while in other embodiments, the base 160 may be manually movable. As will be described in further detail below, the detector 102 may be rotatable around the pipe 110 in discrete increments such as 90 degrees, 45, degrees, or the like. The base 160, housing 130, clamp 104, or the like may include indexing, detents, or the like for preset positions at these discrete increments. As described above, a handle 171 may be attached to the detector 102. The handle 171 may be used to move the detector 102 around the pipe 110. The base 160 may rotatably couple the detector 102 to the pipe 110 while a motor rotates the position of the detector 102 around the pipe 110 and/or holds the detector 102 in a particular position. The base 160 may comprise a connector 162 that is configured to connect base 160 to the detector 102.

In some embodiments, self-centering includes positioning engagement surfaces 157a-c of the clamping arms 150a-c at substantially similar radial distances from each other (e.g., substantially similar arc lengths) over a range of motion of the arms 150a-c. "Substantially similar radial distances" means within 5 or 10 degrees (*) of circumference (360°) divided by the number of arms. For example, for a clamp 104 that includes three arms 150a-c, the engagement surfaces 157a-c, may be approximately 120° (360°/3 arms) apart from each other, where a substantially similar radial distance means the radial distance is between 110° and 130° (for a 10° variation from) 120° or between 115° and 125° (for a 5° variation from) 120°. In another example with a clamp 104 that includes four arms 150, the engagement surfaces 157, may be approximately 90° (360°/4 arms) apart from each other, where a substantially similar radial distance means the radial distance is between 80° and 100° (for a 10° variation from 90°) or between 85° and 95° (for a 5° variation from 90°).

The views of FIGS. 3A and 3B illustrate the clamp 104 disposed on pipes 110 of different diameters. Pipes 110a and 110b are illustrated with dashed lines. The diameter of pipe 110a is greater than the diameter of pipe 110b. In FIG. 3A, the actuator 140 is retracted so that the arm 150c is further from the center 117a of pipe 110a than the center 117b of pipe 110n in FIG. 3B. Due to the linkages between the arm 150c and the arms 150a and 150b, the first lower arm segment 154a and the second lower arm segment 154b have each rotated such that the clamping contacts 156a-b are further from the center 117a of pipe 110a than the center 117b of pipe 110n in FIG. 3B. In some embodiments, when the pipes 110a or 110b are clamped by the clamp 104, the centers 117a and 117b are at substantially the same location relative to the housing 130 over an operable range of the positions of the arms 150. In this example, substantially the same location means that the centers 111a and 111b are in the same location within manufacturing tolerances for the housing 130, arms 150, and associated structures.

In some embodiments, the movement of the actuator 140 is the only movement necessary to couple the clamp 104 to the pipe 110. For example, once the clamp 104 is placed around the pipe 110, the actuator 140 may be actuated to move the arms 150. The arms 150 self-center the clamp 104 on the pipe 110. A user need not actuate other controls.

Figure 4A:
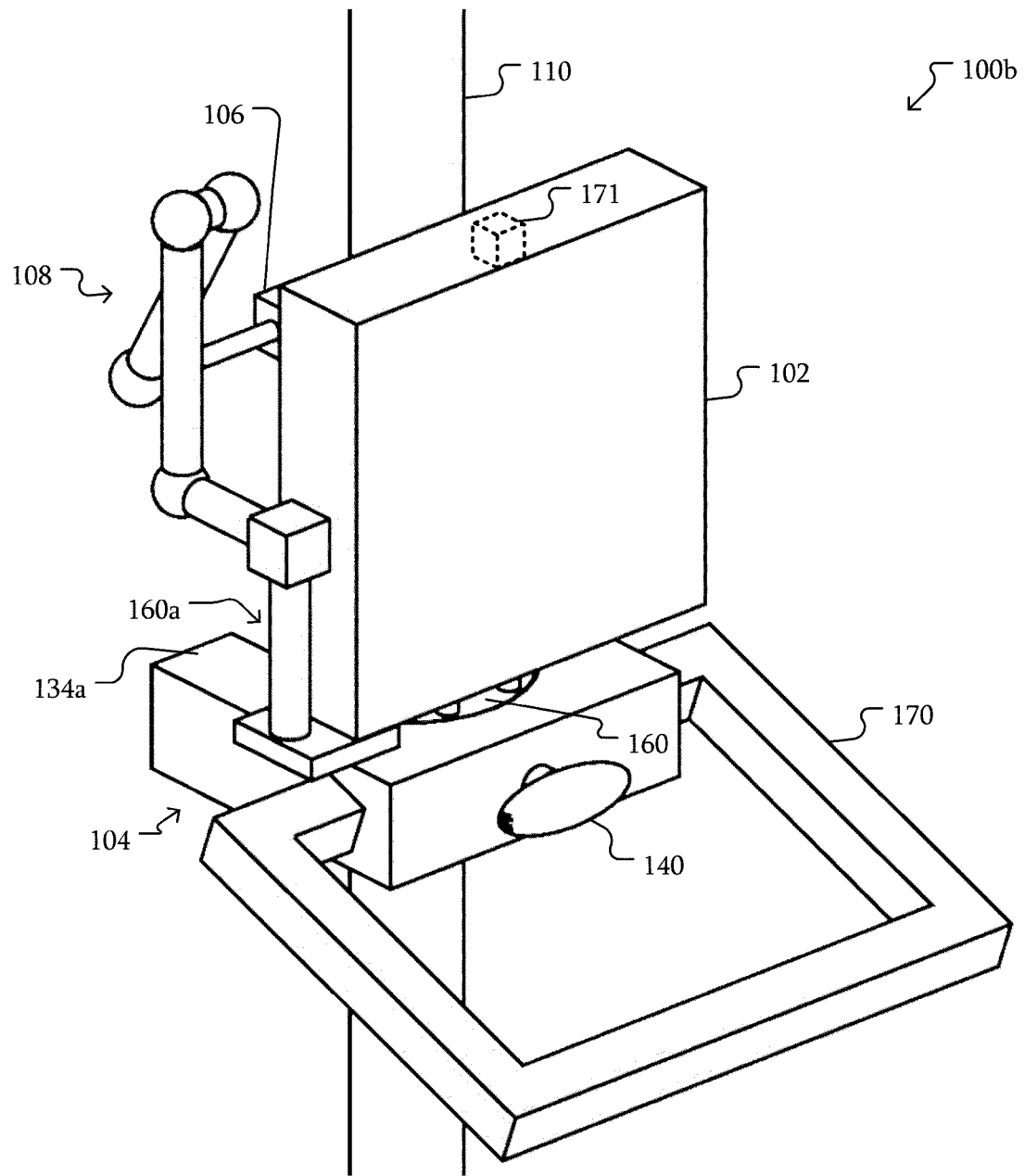
FIGS. 4A-4E are perspective views of a clamp in a radiographic inspection system using radioisotopes according to some embodiments.
Figure 4B:
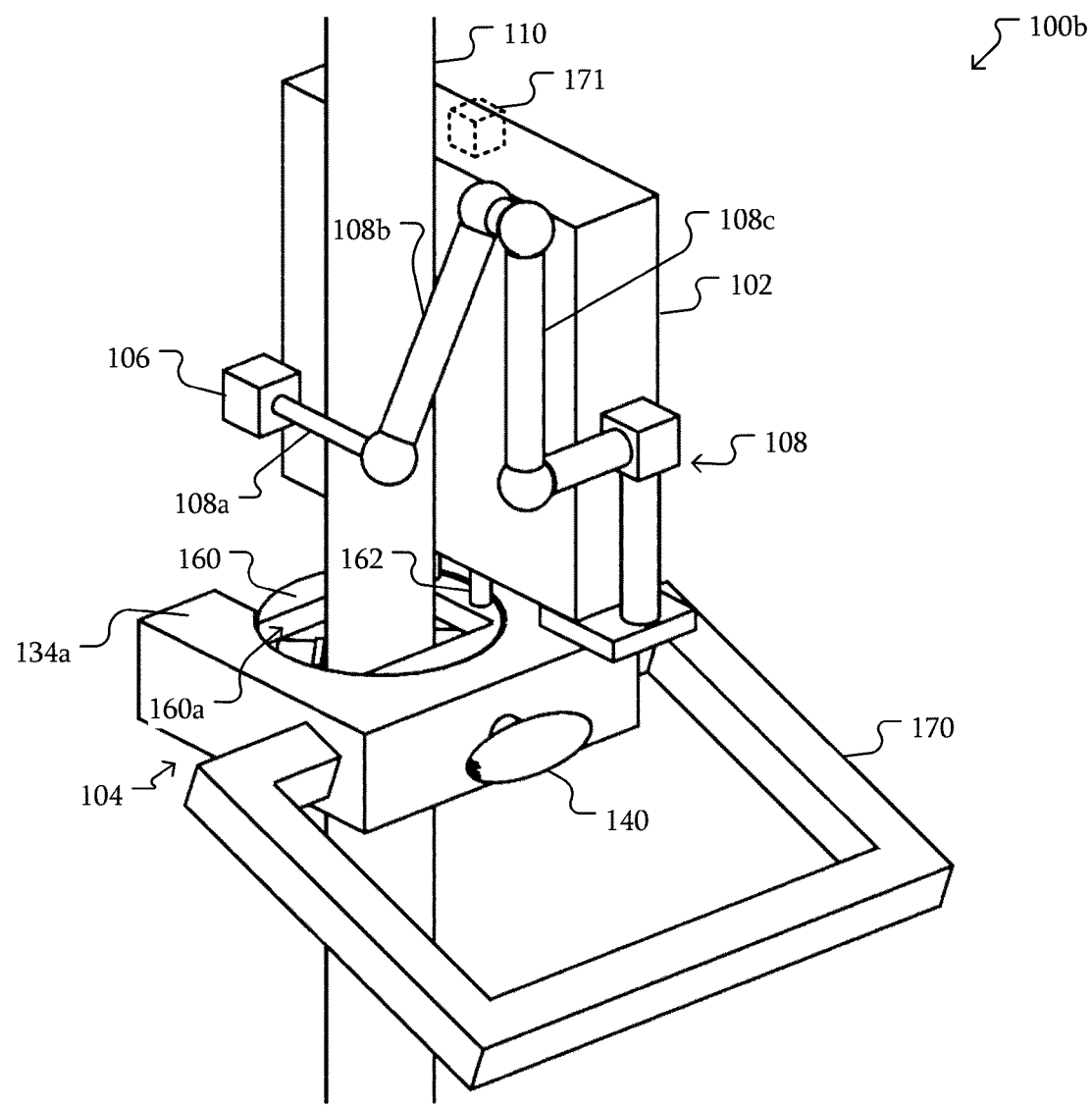
Figure 4C:
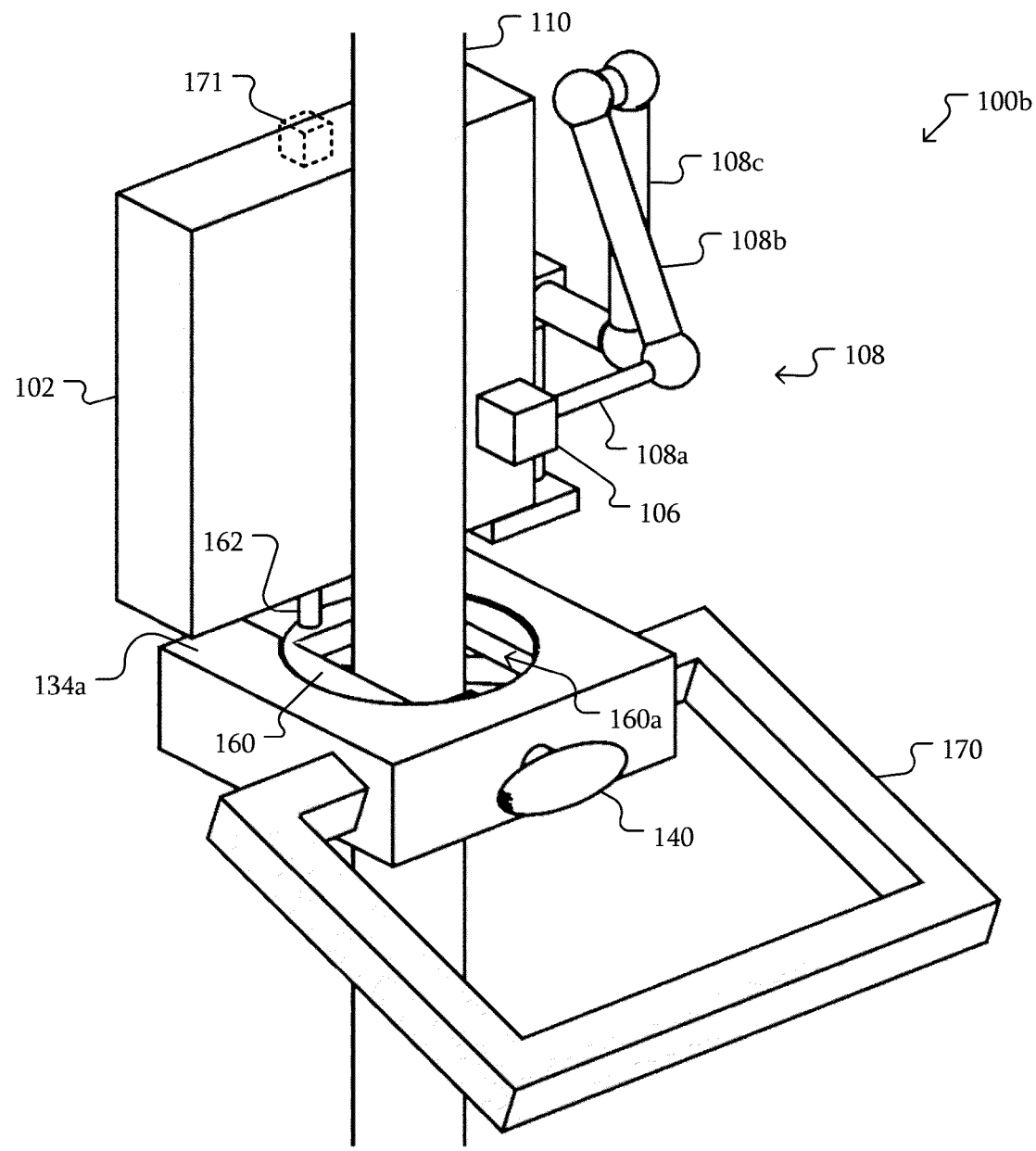
Figure 4D:
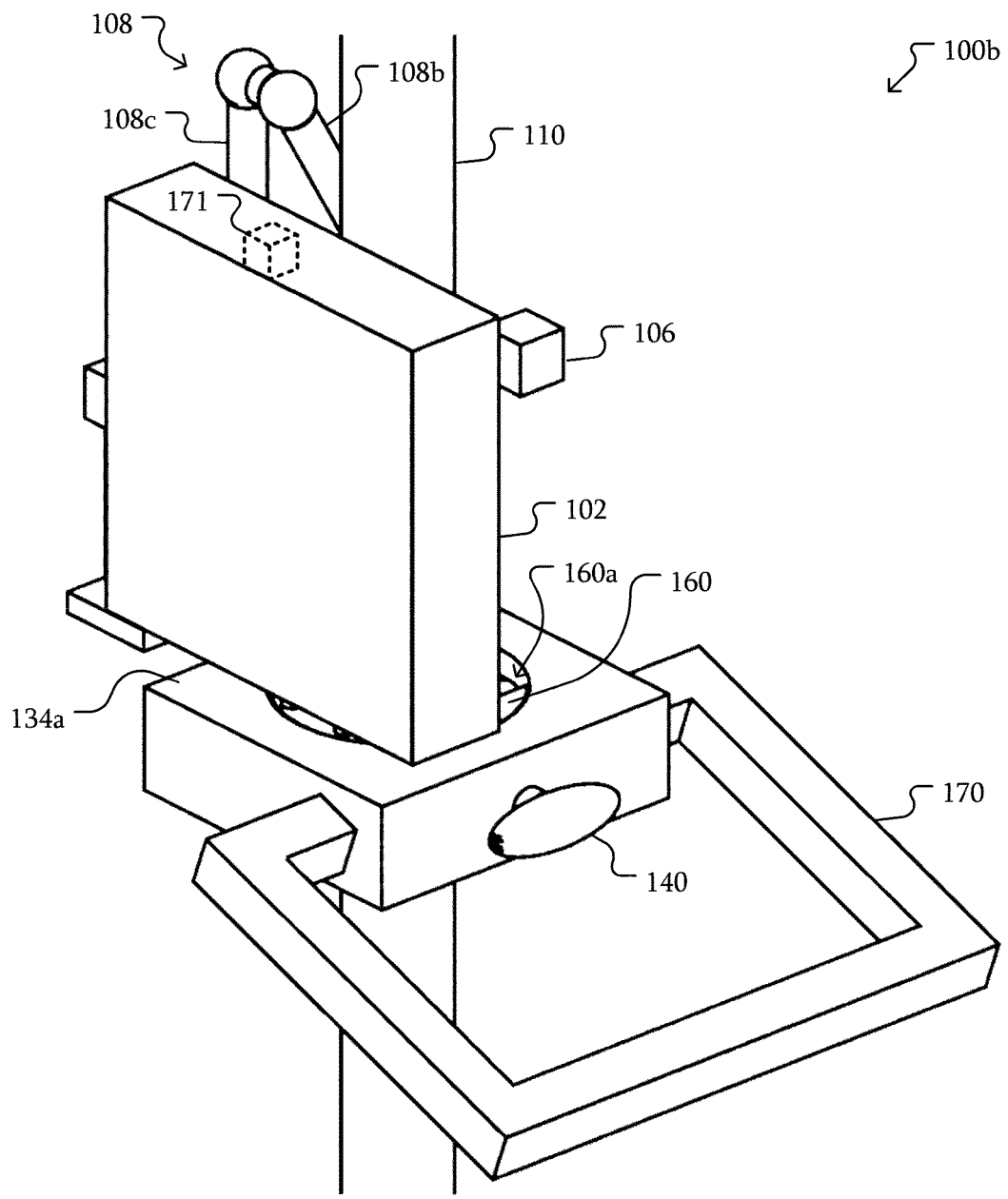

FIGS. 4A-4E are perspective views of a clamp in a radiographic inspection system using radioisotopes according to some embodiments. The radiographic inspection system 100*b* may be mounted on a pipe 110 with the detector 102 in a first position relative to the clamp 104 as illustrated in FIG. 4A. FIGS. 4B-4D illustrate the detector 102 in different positions, each rotated 90 degree from another. While 90 degree increments has been used as an example, in other embodiments, the amount of rotation may be different, such as 180 degrees, 45 degrees, 30 degrees, 15 degrees, or less. As described above, the detector 102 may be rotated around the pipe in a continuous manner.

The base 160 includes an opening 160*a*. The opening 160*a* may be large enough to allow a pipe 110 of a maximum size of pipe 110 to which the clamp 104 is capable of attaching to be inserted into the opening 160*a* and the contacts 156. In some embodiments, a size of pipe 110 that may be inserted through the opening 160*a* may be smaller than a capability of the contacts 156.

Once the clamp 104 is attached to the pipe 110. The detector 102 may be rotated around the pipe 110 by rotating the base 160. An axis of rotation of the base 160 may be aligned with the center of the pipe 110. As a result, the detector 102 and the collimator 106 may maintain a relative position to the pipe 110 as it rotates around the pipe 110 within manufacturing tolerances.

The collimator support arm 108 may include multiple portions such as portions 108*a-c*. The portions 108*a-c* may be adjustable relative to each other. As a result, a position of the collimator 106 relative to the detector 102 may be adjustable. The collimator support arm 108 may be rigidly or semi-permanently attached to the detector 102.

Figure 4E:
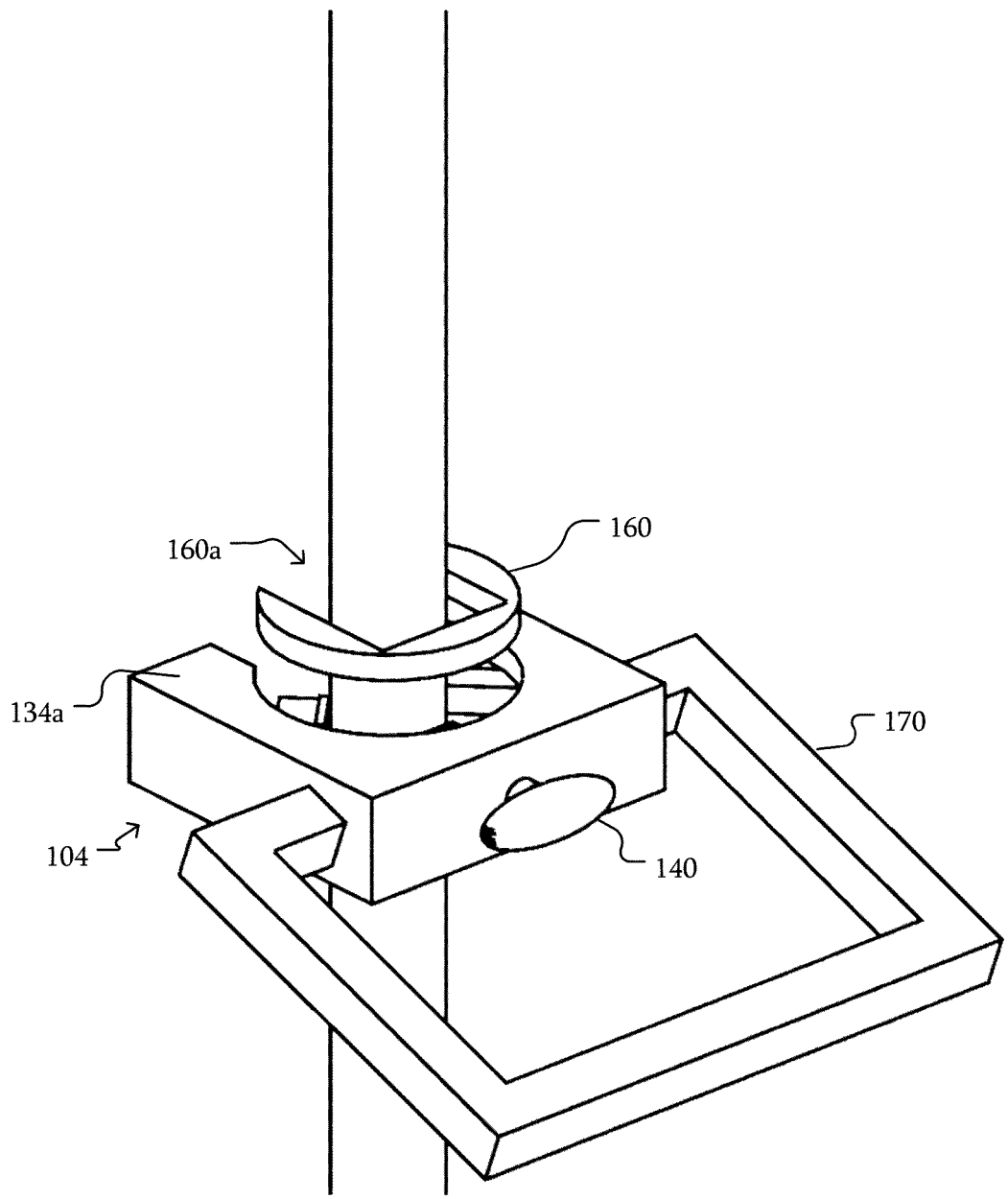

FIG. 4E shows a partially expanded view of the clamp 104 with the detector 102 removed. The base 160 is separated from the clamp 104 to illustrate the opening 160*a*. The rotational position of the base in FIG. 4E is the same as in FIG. 4A. Actuators (not illustrated) such as motors, gears, pulleys, or the like may be coupled to one or both of the base 160 and the housing 130. The system 100*b* may include one or more of a battery, a wired power source, or the like configured to supply power to the actuators.

As shown in FIGS. 2, 3A, 4A-4E, and 5A-5B, the clamp 104 may have a handle 170 so that clamp 104 may be easily grasped so the clamp 104 may be carried by a single hand of a user and/or operator. In some embodiments, the clamp 104 does not have such a handle 170.

Figure 5A:
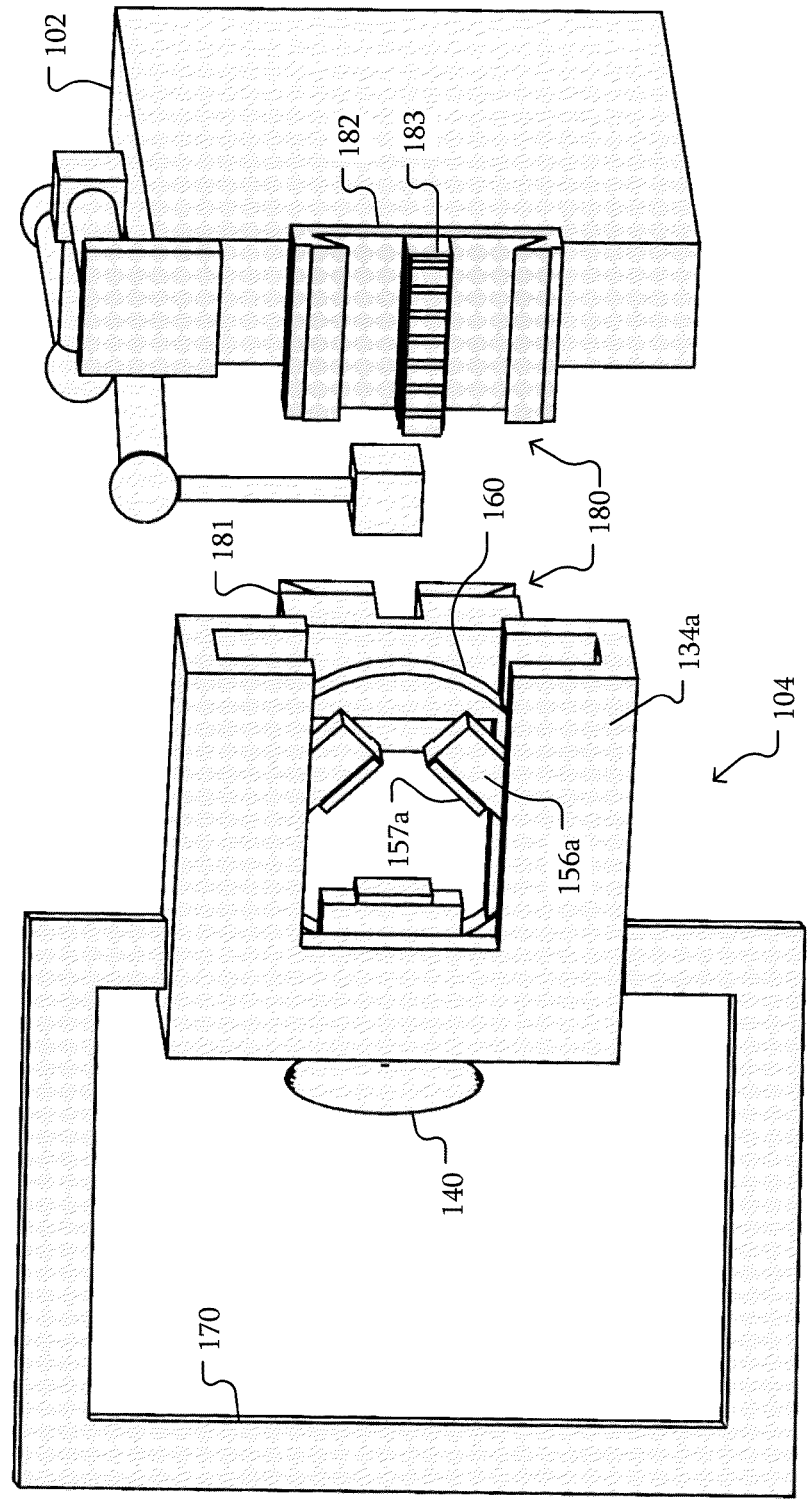
FIG. 5A-5B are perspective views of a detached clamp and detector that are part of a radiographic inspection system according to some embodiments.
Figure 5B:
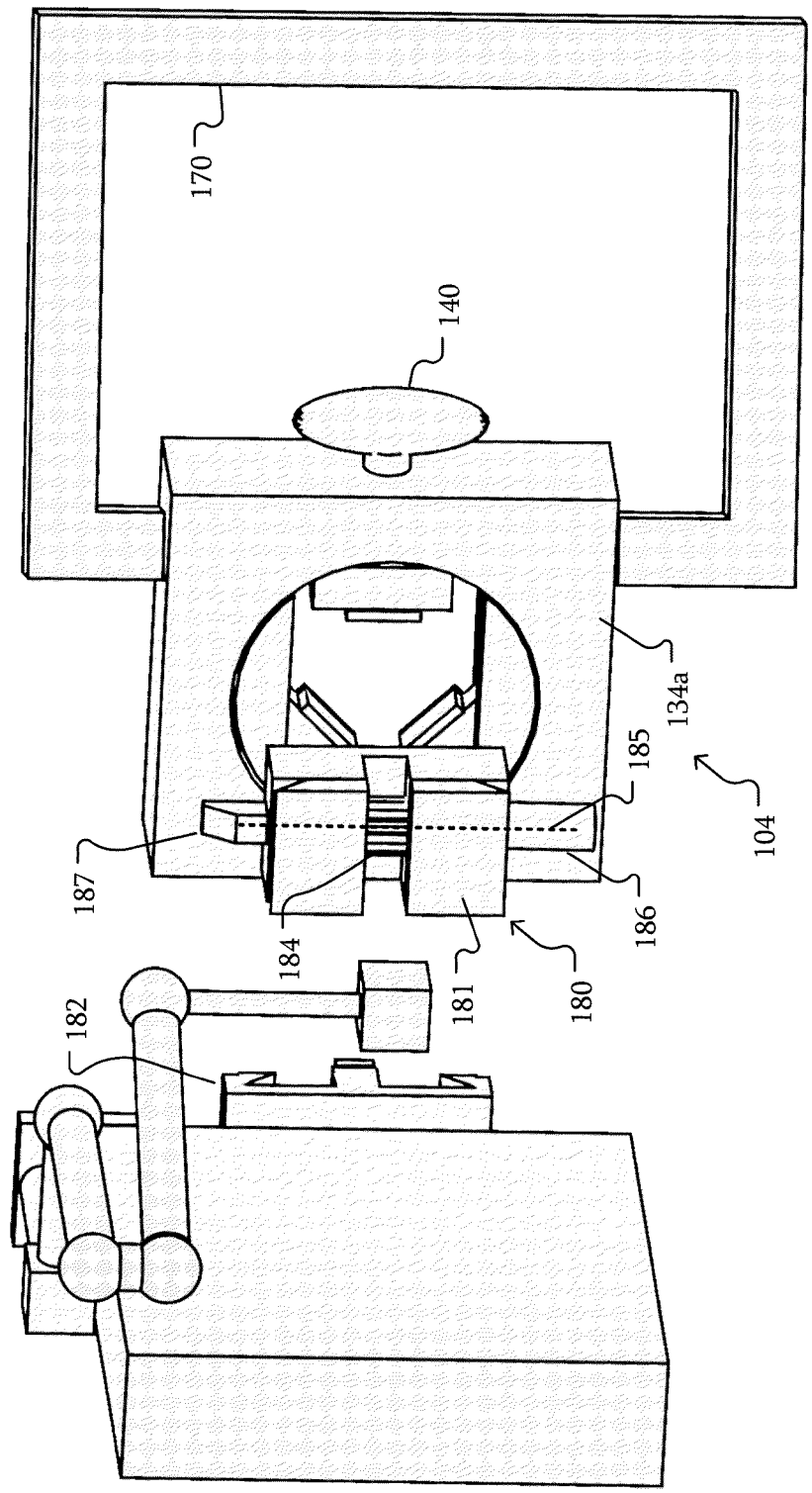

FIG. 5A-5B are perspective views of a detached clamp and detector that are part of a radiographic inspection system according to some embodiments. Referring to FIGS. 5A-5B, the clamp 104 of the radiographic inspection system 100 may include an elevation adjustment mechanism 180, which may be manually, automatically, or electronically adjusted. A similar elevation adjustment mechanism is disclosed with reference to FIG. 6 of U.S. Patent Application Publication No. 2021/0190705. The entire disclosure of U.S. Patent Application Publication No. 2021/0190705 is hereby incorporated by reference. The elevation adjustment mechanism 180 includes a first structure 181 and a second structure 182 that are movable relative to each other and may be fixed relative to each other. The first structure 181 may be coupled to the base 160 and the second structure 182 may be coupled to the detector 102. For example, in some embodiments, the elevation adjustment mechanism 180 may include a linear gear 183 attached to the second structure 182. A cylindrical gear 184 may be attached to the first structure 181 and disposed to mesh with the linear gear 183. A shaft 185 (illustrated with a dashed line) within the elevation adjustment mechanism 180 with an adjustment knob 186 may allow for movement of the first structure 181 relative to the second structure 182. Although an adjustment knob 186 is shown in FIGS. 5A-5B, in other examples, the elevation of the elevation adjustment mechanism may include actuators such as motors, solenoids, hydraulic or pneumatic cylinders, or the like configured to operate the gears. In some embodiments the control logic 109 may be coupled to the actuators and configured to control the actuators to adjust the elevation adjustment mechanism move the radiographic inspection system to a desired elevation. Although a linear gear 183 has been used as an example of a part of a mechanism to adjust a position of the detector 102, in other embodiments, different mechanisms may be used that allow for translation of the detector relative to the clamp 104.

When the radiographic inspection system 100*b* is attached to a pipe 110, the clamp 104 may attach the detector 102 including the elevation adjustment mechanism 180 to the pipe 110 such that base 160 may move the detector 102 around the pipe 110 and the distance between the detector 102 and the pipe 110 may be adjusted to be closer together or further apart. The first structure 181 may be rigidly coupled to the base 160. A separation of the first structure 181 to a center of the pipe 110 may remain substantially the same as the base 160 rotates around the pipe 110 as it rotates within the clamp 104. That is, the axis of rotation of the base 160 may be coincident with the center of the pipe 110. However, the second structure 182 is movable relative to the first structure 181 and thus, the second structure 182 may be moved relative to the pipe 110. The imaging array 111 of the detector 102 may be attached to the second structure 182 such that its relative distance to the pipe 110 may be adjusted. This elevation adjustment mechanism 180 may allow for greater precision in positioning the detector for a given pipe 110. A locking system 187 may lock the detector 102 in place after adjustment.

The connection between the detector 102, clamp 104, collimator support arm 108, radioisotope collimator 106, exposure tube 114, the elevation adjustment mechanism 180, or the like may have quick connect features to allow quick separation for easier handling, faster movement from one location to another, or the like. In addition, the collimator support arm 108 may also have such quick connect features so that the number of degrees of freedom and/or type of joints may be changed as desired in the field.

Figure 6A:
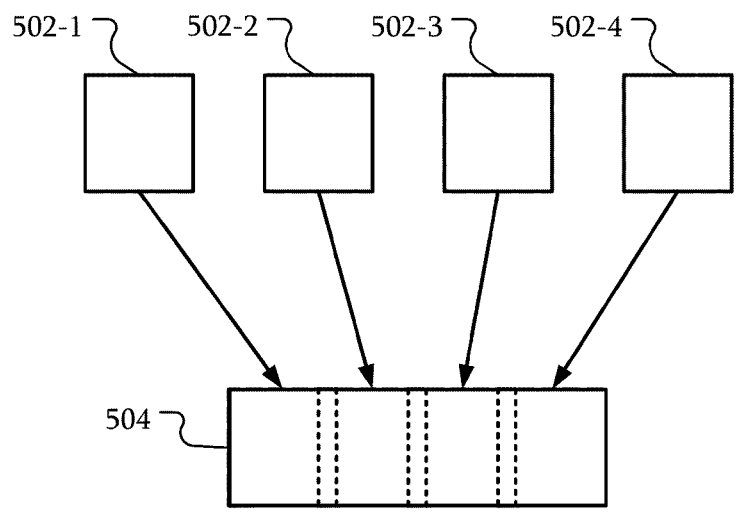
FIGS. 6A-6B are block diagrams of operations performed on images from a radiographic inspection system according to some other embodiments.
Figure 6B:
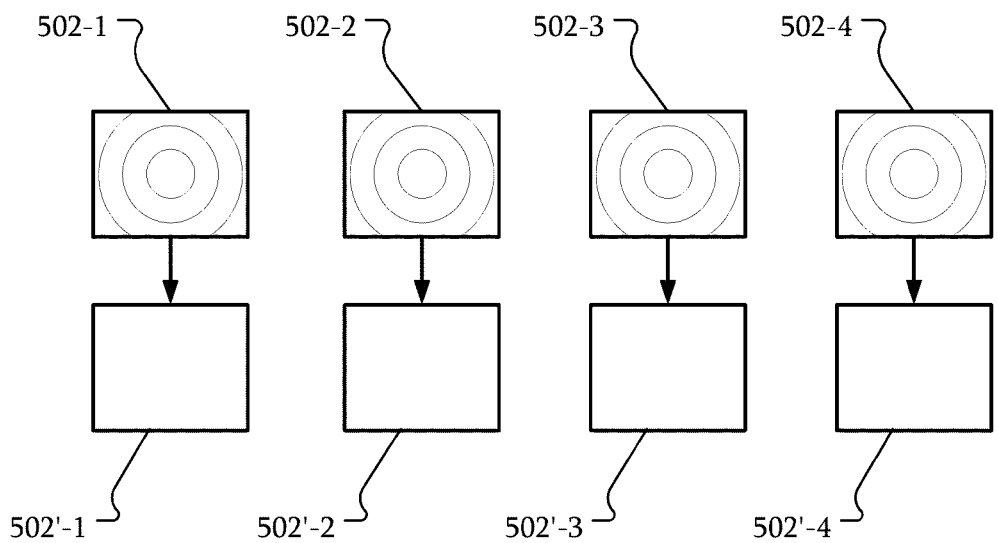

FIGS. 6A and 6B are block diagrams of operations performed on images from a radiographic inspection system according to some other embodiments. Referring to FIG. 6A, multiple images 502 (such as images 502-1 to 502-4) may be acquired at different positions around an object. The images 502 may be combined into a composite image 504. The dashed lines represent the borders of the individual images 502. In the overlapping regions, the images may be combined in a variety of ways. For example, the data may be averaged in the overlapping region, combined using a weighted average depending on proximity to one or the other of the two images, or the like. Although some overlap has been used as an example, in other embodiments, the imaged may be tiled together without overlap.

Referring to FIG. 6B, in some embodiments, the images 502 may be preprocessed before being combined as described above. For example, the curvature of the object, such as the curvature of a pipe wall, the relative intensity of the radiation 118, or the like may be used to scale, distort, or otherwise transform the data of each image 502 into a transformed image 502' (such as transformed images 502'-1 to 502'-4). In some embodiments, the images may be processed to normalize the images to represent an image taken as if the imaging array 111 followed the contour of the object and a substantially uniform radiation source was used to illuminate the imaging array 111. The contour lines on images 502 of FIG. 6B represent the variation in the images before normalization.

In some embodiments, operations 820, 830, and 840 may be performed on a continuous basis. For example, the rotation in 840 and the acquiring of an image in 820 may be performed in parallel. As a result, a composite image in 860 may be generated from the continuous scanning.

FIG. 7 is a flowchart of an operation of a radiographic inspection system according to some embodiments. Using the system 100a of FIGS. 1A and 1B as an example, in 800, the radiographic inspection system 100a is positioned on a structure. For example, the system 100a, 100b, or the like described above may be placed on a structure such as a pipe 110 by securing a clamp 104 to the pipe 110. In some embodiments, the operation may be performed by a single person. In some embodiments, the operation may be performed with a single actuation of an actuator of the clamp 104. The clamp 104 may be self-centered around the pipe 110.

In 810, radiation from a radiation source is emitted. For example, a radioisotope 118 may be exposed. The radioisotope 118 may be extended into the radioisotope collimator 106. In another example, a radiation source such as an x-ray source may be controlled to emit x-rays. The emission from a radioisotope 118 will be used as an example however, the radiation may be emitted from any type of radiation source. In 820 an image is acquired using a detector 102 positioned with the structure between the exposed radioisotope 118 and the detector 102. The acquisition of an image may include the acquisition of multiple images that are averaged or otherwise combined into a single image.

In 830, if an additional image is to be acquired, the detector 102 is rotated around the structure in 840. If not, the radioisotope 118 may be retracted in 850. Alternatively, the emission of radiation may be stopped in 850 by turning off the radiation source, such as by turning off an x-ray source. Once the desired number of images have been acquired, the imaged may be combined into a composite image in 860.

While industrial digital radiography (DR), having numerous technological benefits, has garnered increased usage in the industrial weld quality field, one application remains elusive for direct radiography. Small diameter piping continues to be examined only with traditional radiography film or in some instances computed radiography (CR) using phosphor images plates similar to film. Construction and fabrication codes such as American Society of Mechanical Engineers (ASME) codes require proper techniques to be utilized to achieve consistent quality. For the past several years it has become increasingly common for "shortcuts" that can compromise quality be used in the industry to decrease the time and complexity of the application.

Direct radiography coupled with the clamp 104 described herein may provide decreased exposure time with improved quality and productivity. The lightweight, self-centering clamp 104 may be easily positioned and attached to a pipe by a single person. The detector 102 may be designed to quickly attach/detach to the clamp 104. Once attached and the initial source positioning is accomplished, the system allows for simultaneous movement of the positioned source and the detector 102 for subsequent exposures. That is, once the elevation of the detector 102 is set for a given pipe 110 and weld, the clamp 104 may be detached from the weld, moved, and reattached at the next weld by actuating the self-centering operation of the clamp 104. These "locked in" setup parameters allow for rapid transition to the next weld segment, while maintaining technique quality and consistency. This technique's consistency, coupled with the real time image feedback to the operator, virtually eliminates the need for re-shots due to technician error. The system may easily adaptable to both super-imposed (double wall exposure/double wall view) and elliptical (double wall exposure/single wall view) radiographic techniques.

Inspecting small bore pipes have always been a challenging task especially with digital technology to meet ASME code standards. Embodiments described herein may allow users to be able to use the clamp that is integrated with a radiation source and the detector to be easily positioned around a pipe to produce radiographic images at different angles with improved productivity and also improved image quality.

Some embodiments include a radiographic inspection system 100 (100a, 100b), comprising: a detector 102; a clamp 104 configured to attach the detector 102 to a structure 110 such that the detector 102 is movable around the structure 110; a radioisotope collimator 106; and a collimator support arm 108, 108a, 108b coupling the detector 102 to the radioisotope collimator 106 such that the radioisotope collimator 106 moves with the detector 102.

Some embodiments include a radiographic inspection system 100 (100a, 100b), comprising: a clamp 104 comprises a housing 130 130, a base 160, three clamping contacts 156, and an actuator 140; wherein: the clamp 104 is configured to be positioned around a structure 110 and to be coupled to the structure 110; the base 160 is moveable relative to the housing 130 and is configured to support a detector 102 such that the detector 102 may rotate around the structure 110 while the clamp 104 remains stationary relative to the structure 110; and the three clamping contacts 156 are moveable relative to the housing 130 via the actuator 140 in a manner such that the three clamping contacts 156 self-center on the structure 110.

In some embodiments, the base 160 is coupled to the housing 130 through a rotary bearing.

In some embodiments, the radiographic inspection system further comprises a detector 102, wherein the clamp 104 is coupled to the detector 102.

In some embodiments, the clamp 104 further comprises three arms 150 and wherein each clamping contacts 156 is positioned on one of the arms 150.

In some embodiments, the movement of the actuator 140 is the only movement necessary to couple the clamp 104 to the structure 110.

In some embodiments, the clamp 104 further comprises a central arm 150c, a first articulated arm 150a, and a second articulated arm 150b; wherein the first articulated arm 150a is connected to the central arm 150c via a first upper hinge 151a; and wherein the second articulated arm 150b is connected to the central arm 150c via a second upper hinge 151b.

In some embodiments, the first articulated arm 150a comprises a first upper arm segment 152a and a first lower arm segment 154a that is connected to the first upper arm segment 152a via a first lower hinge 153a; and wherein the second articulated arm 150 comprises a second upper arm segment 152b and a second lower arm segment 154b that is connected to the second upper arm segment 152b via a second lower hinge 153b.

In some embodiments, a first knuckle pin 139a and a second knuckle pin 139b extend from the housing 130; the first knuckle pin 139a extends through the first lower arm segment 154a such that the first lower arm segment 154a may pivot about the first knuckle pin 139a; and the second knuckle pin 139b extends through the second lower arm segment 154b such that the second lower arm segment 154b may pivot about the second knuckle pin 139b.

In some embodiments, the housing 130 defines a hole 136 and the actuator 140 comprises a screw 144 extending from a handle 142, and the screw 144 is threadingly engaged in the hole 136 of the housing 130 and is connected to at least one of the three clamping contacts 156.

In some embodiments, the radiographic inspection system further comprises an x-ray or gammaray source; and a collimator support arm 150 coupling the detector 102 to the x-ray or gammaray such that the x-ray or gammaray moves with the detector 102.

In some embodiments, the x-ray or gammaray source includes a radioisotope collimator.

In some embodiments, the radiographic inspection system further comprises control logic 109 configured to rotate the detector 102 and the radioisotope collimator around the structure 110.

In some embodiments, the control logic 109 is further configured continuously acquire data from the detector 102 as the detector 102 rotates.

In some embodiments, the control logic is further configured to acquire a plurality of images from the detector 102, and each image is acquired at a different rotational position.

In some embodiments, the radiographic inspection system further comprises a wireless communication system 113; wherein the control logic 109 is further configured to communicate data from the detector 102 through the wireless communication system 113.

In some embodiments, the radiographic inspection system further comprises an elevation adjustment mechanism 180 configured to change relative position of the detector 102 and the clamp 104.

In some embodiments, the system 100 further comprises control logic 109 configured to rotate the detector 102 and the radioisotope collimator 106 around the structure 110.

In some embodiments, the control logic 109 is further configured continuously acquire data from the detector 102 as the detector 102 rotates.

In some embodiments, the control logic 109 is further configured to acquire a plurality of images from the detector 102, and each image is acquired at a different rotational position.

In some embodiments, the control logic 109 is further configured to combine the images into a composite image.

In some embodiments, the control logic 109 is further configured determine at least one of a dwell time and a number of the images.

In some embodiments, the system 100 further comprises a wireless communication system 100; wherein the control logic 109 is further configured to communicate data from the detector 102 through the wireless communication system 100.

In some embodiments, the control logic 109 is further configured to select an active area of the detector 102 less than an entire active area of the detector 102 for the acquisition of the images.

The system 100 of claim 10, wherein the control logic 109 is further configured to generate scanning parameters based on at least one of the structure 110 and a radioisotope.

In some embodiments, the collimator support arm 108, 108a, 108b is adjustable.

In some embodiments, the support arm 108, 108a, 108b comprises at least two degrees of freedom.

A method, comprising: positioning a clamp 104 around a structure 110 110, wherein the clamp is connected to a detector 102; coupling the clamp 104 to the structure 110 such that the clamp 104 self-centers on the structure 110 110; exposing a radioisotope; and acquiring a plurality of images using the detector 102 while the structure 110 is positioned between the exposed radioisotope and the detector.

In some embodiments, positioning the clamp 104 comprises self-centering the clamp 104 on the structure 110.

In some embodiments, the method further comprises rotating the radioisotope around the structure 110 with the detector 102.

In some embodiments, rotating the detector 102 around the structure 110 comprises rotating the detector 102 around the structure 110 between the acquisitions of each sequential pair of the images.

In some embodiments, the method further comprises combining the images into a composite image.

In some embodiments, the method further comprises selecting a number of the images based on attributes of the structure 110.

In some embodiments, the clamp 104 comprises three clamping contacts 156 that engage the structure 110 when the clamp 104 self-centers on the structure 110.

In some embodiments, the three clamping contacts 156 are moveable via an actuator 140.

In some embodiments, coupling the clamp to the structure is performed using only the actuator 140.

In some embodiments, the radiation source 106 includes a radioisotope 118; and further comprising: rotating the detector 102 around the structure 110 between the acquisition of at least two of the images; and retracting the radioisotope 118 into an exposure device 116 only after completing the acquiring of the images, wherein emitting radiation from the radiation source 106 comprises extending the radioisotope 118 from the exposure device 116.

Some embodiments include a system, comprising: means for generating images in response to radiation; means for collimating radiation; means for attaching the means for generating images in response to radiation to the means for collimating the radiation; and means for movably coupling the means for generating images in response to radiation to a structure 110 such that the means for movably coupling self-centers on the structure 110.

Examples of the means for generating images in response to radiation include the detector 102, imaging array 111, and control logic 109.

Examples of the means for collimating radiation include the radioisotope collimator 106.

Examples of the means for attaching the means for generating images in response to radiation to the means for collimating the radiation include the collimator support arm 108, 108a, and 108b.

Examples of the means for movably coupling the means for generating images in response to radiation to a structure 110 such that the means for movably coupling self-centers on the structure 110 include the clamp 104.

In some embodiments, the system further comprises means for actuating the means for movably coupling.

Examples of the means for actuating the means for movably coupling includes the actuators such as actuator 140.

In some embodiments, the system further comprises means for means for combining a plurality of images from the means for generating images in response to radiation into a composite image.

Examples of the means for means for combining a plurality of images from the means for generating images in response to radiation into a composite image include the control logic 109 and the computer 190.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims. The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on. Recitation in the claims of the term "first" with respect to a feature or element does not necessarily imply the existence of a second or additional such feature or element.

Elements specifically recited in means-plus-function format, if any, are intended to be construed to cover the corresponding structure, material, or acts described herein and equivalents thereof in accordance with 35 U.S.C. § 112 16. Embodiments of the invention in which an exclusive property or privilege is claimed are defined as follows.

The invention claimed is:

1. A method, comprising:
positioning a clamp around a structure, wherein the clamp is coupled to a detector;
coupling the clamp to the structure such that the clamp self-centers on the structure by moving clamping contacts along paths that maintain the clamping contacts equidistant from a center of the clamping contacts;
emitting radiation from a radiation source; and
acquiring a plurality of images using the detector while the structure is positioned between the exposed radiation source and the detector.

2. The method of claim 1, wherein the clamp comprises three clamping contacts that engage the structure when the clamp self-centers on the structure.

3. The method of claim 2, wherein the three clamping contacts are moveable via an actuator.

4. The method of claim 3, wherein coupling the clamp to the structure is performed using only the actuator.

5. The method of claim 1, wherein:
the radiation source includes a radioisotope; and
further comprising:
rotating the detector around the structure between the acquisition of at least two of the images; and
retracting the radioisotope into an exposure device only after completing the acquiring of the images, wherein emitting radiation from the radiation source comprises extending the radioisotope from the exposure device.

6. A radiographic inspection system, comprising:
a clamp comprising a housing, a base, three clamping contacts, and an actuator;
wherein:
the clamp is configured to be positioned around a structure and to be coupled to the structure;
the base is moveable relative to the housing, and is configured to support a detector such that the detector may rotate around the structure while the clamp remains stationary relative to the structure; and
the three clamping contacts are moveable relative to the housing via the actuator in a manner such that the three clamping contacts self-center on the structure.

7. The system of claim 6, further comprising:
a detector, wherein the clamp is coupled to the detector.

8. The system of claim 7, wherein the clamp further comprises three arms and each of the clamping contacts is positioned on one of the arms.

9. The system of claim 7, wherein the movement of the actuator is the only movement necessary to couple the clamp to the structure.

10. The system of claim 6, wherein:
the clamp further comprises a central arm, a first articulated arm, and a second articulated arm;
the first articulated arm is connected to the central arm via a first upper hinge; and
the second articulated arm is connected to the central arm via a second upper hinge.

11. The system of claim 10, wherein:
the first articulated arm comprises a first upper arm segment and a first lower arm segment that is connected to the first upper arm segment via a first lower hinge; and
the second articulated arm comprises a second upper arm segment and a second lower arm segment that is connected to the second upper arm segment via a second lower hinge.

12. The system of claim 11, wherein:
a first knuckle pin and a second knuckle pin extend from the housing;
the first knuckle pin extends through the first lower arm segment such that the first lower arm segment may pivot about the first knuckle pin; and
the second knuckle pin extends through the second lower arm segment such that the second lower arm segment may pivot about the second knuckle pin.

13. The system of claim 6, wherein:
the housing defines a hole and the actuator comprises a screw extending from a handle, and the screw is threadingly engaged in the hole of the housing and is connected to at least one of the three clamping contacts.

14. The system of claim 6, further comprising:
an x-ray or gammaray source; and
a collimator support arm coupling the detector to the x-ray or gammaray such that the x-ray or gammaray moves with the detector.

15. The system of claim 14, wherein the x-ray or gammaray source includes a radioisotope collimator.

16. The system of claim 15, further comprising
control logic configured to rotate the detector and the radioisotope collimator around the structure.

17. The system of claim 16,
wherein the control logic is further configured to:
continuously acquire data from the detector as the detector rotates; or
acquire a plurality of images from the detector, and each image is acquired at a different rotational position.

18. The system of claim 6, further comprising:
an elevation adjustment mechanism configured to change relative position of the detector and the clamp.

19. A system, comprising:
a detector for generating images in response to radiation;
a radiation source for generating radiation;
a collimator support arm for attaching the detector to the radiation source;
a clamp for movably coupling the detector to a structure such that the clamp self-centers on the structure; and
an actuator for coupling the clamp to the structure by moving clamping contacts of the clamp.

20. The system of claim 19, wherein the actuator is configured to move the clamping contacts along paths that maintain the clamping contacts equidistant from a center of the clamping contacts.

* * * * *